United States Patent [19]
Sill et al.

[11] 3,879,055
[45] Apr. 22, 1975

[54] VEHICLE STABILIZING DEVICE

[75] Inventors: Mark N. Sill, Bristol; Delton F. Miller, Elkhart, both of Ind.

[73] Assignee: Marksill Specialties Inc., Bristol, Ind.

[22] Filed: Dec. 29, 1972

[21] Appl. No.: 319,883

[52] U.S. Cl.............. 280/150.5; 254/45; 254/86 R; 254/106
[51] Int. Cl. ............................................. B60s 9/02
[58] Field of Search............ 254/45, 86 R, 106, 107; 280/150.5; 248/354 R, 354 L

[56] References Cited
UNITED STATES PATENTS

| | | | |
|---|---|---|---|
| 2,162,181 | 6/1939 | Skinner............................ | 280/150.5 |
| 3,370,817 | 2/1968 | Weber et al. .................... | 248/354 R |
| 3,489,428 | 1/1970 | Hunter et al..................... | 280/150.5 |

FOREIGN PATENTS OR APPLICATIONS

| | | | |
|---|---|---|---|
| 920,508 | 11/1949 | Germany............................ | 254/106 |
| 26,094 | 2/1932 | Netherlands........................ | 254/106 |

*Primary Examiner*—Al Lawrence Smith
*Assistant Examiner*—Robert C. Watson
*Attorney, Agent, or Firm*—Hobbs & Green

[57] ABSTRACT

The vehicle stabilizing device in which two elongated upper and lower members in telescopic relation are extended by a first lever to an infinite number of positions and are releasably held in the adjusted position by a second lever. The upper end of the upper elongated member is adapted to be attached to the under side of the camper, trailer or similar vehicle, such as a camper or trailer, by a fixture pivotally supporting the elongated members in vertical and horizontal positions, and a latch retains the members in either of the two positions.

5 Claims, 9 Drawing Figures

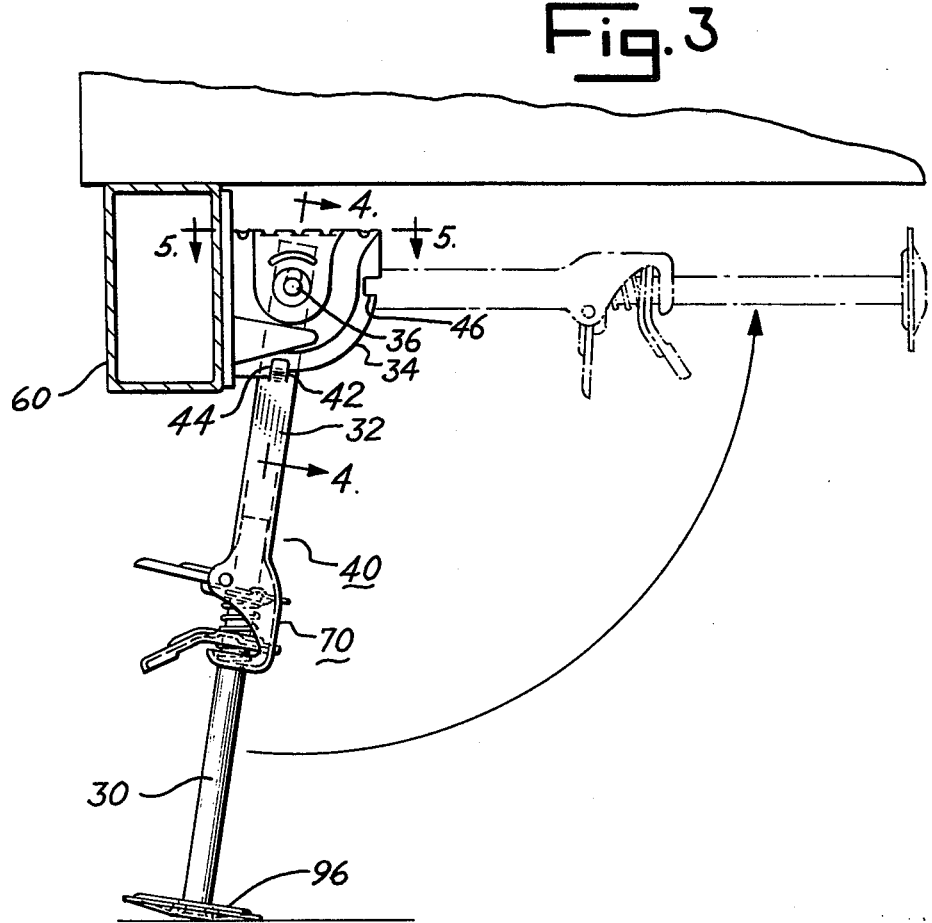
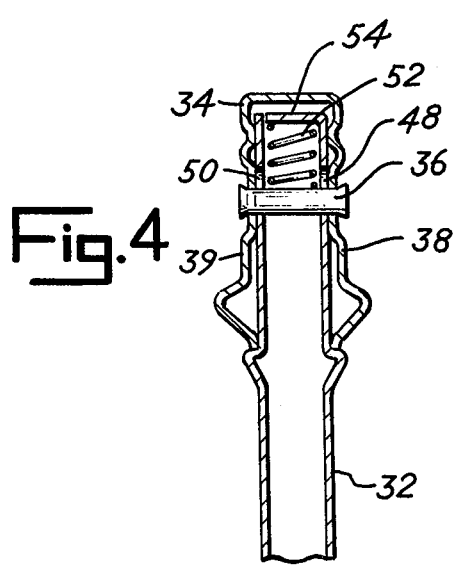
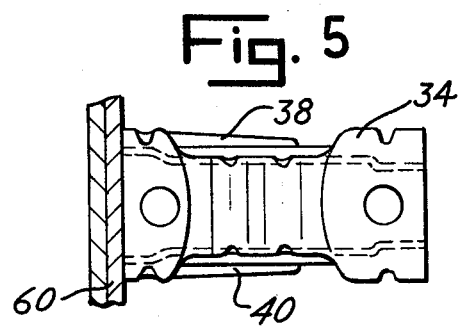

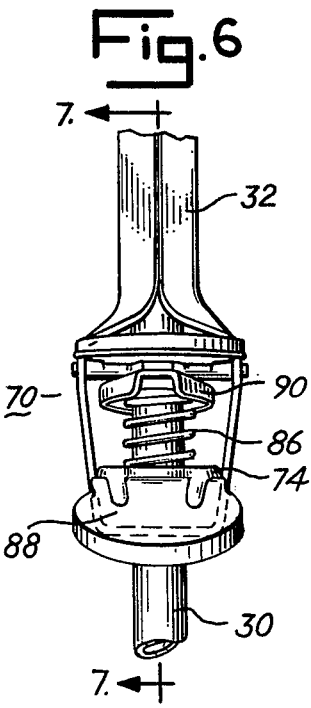
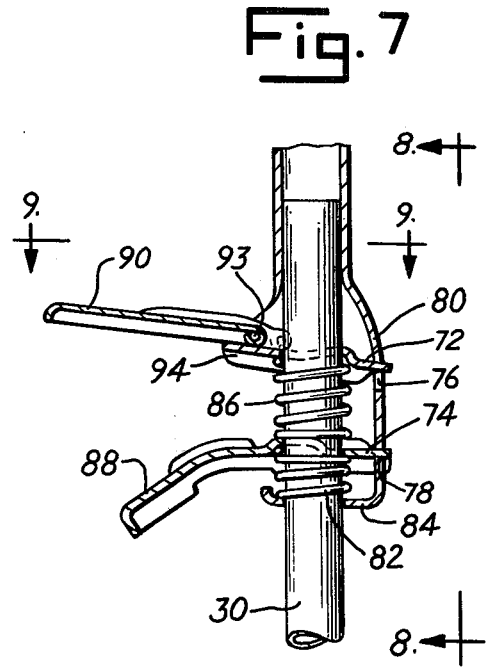
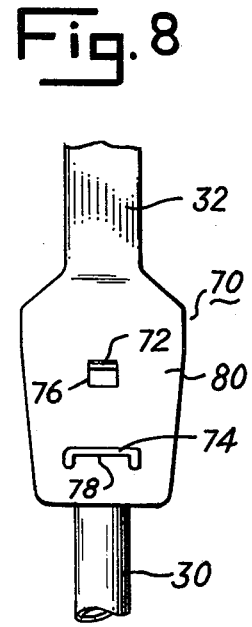
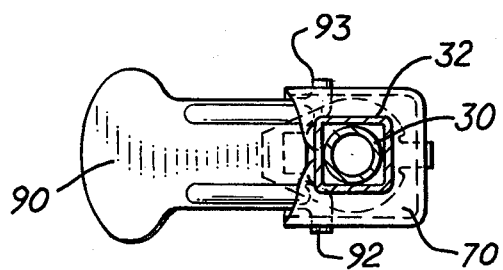

VEHICLE STABILIZING DEVICE

Campers and similar trailers or vehicles, after being disconnected from the tractive vehicle, are normally supported during parking by the undercarriage and a retractable leg or jack connected to the vehicle tongue; however, since the body of the parked vehicle tends to rock or sway as it is used by the occupants or is subjected to strong winds, the practice in the past has been to place blocks or the like between the ground and the under side of the body, either at the four corners or at least at the two rear corners. As an alternative, extendable and retractable devices have been used, and these devices are sometimes connected to the under side of the vehicle body and are folded upwardly next to the floor or frame of the vehicle when the vehicle is to be transported. These prior devices have either been difficult to extend and contract or have been ineffective in providing a firm support for the vehicle, or they have required separate tools or handles to operate and are often inconvenient to use or return to their folded and stored position. It is therefore one of the principal objects of the present invention to provide a device for stabilizing parked vehicles, such as campers or other types of trailers, which operates similar to a jack to produce firm and reliable support for the corners of the vehicle and which can easily be lengthened and shortened to meet parking ground conditions and can readily be folded for movement of the vehicle and unfolded to their operating position for supporting the parked vehicle.

Another object of the invention is to provide a parked vehicle stabilizing device which has an infinite number of adjustment positions so that the device can be effectively adjusted to properly support the vehicle, and which is attached to the under side of the vehicle and can be easily unfolded for the stabilizing operation and folded upwardly beneath the vehicle body when the vehicle is to be transported.

Still another object of the invention is to provide a stabilizing device of the foregoing type which is compact and simple to operate and which can be operated by the foot to both engage and release the device without the use of any separate handle, rod or tool.

A further object is to provide a stabilizing device for parked campers, trailers and similar vehicles, which remains firmly in its extended stabilizing position or in its folded position beneath the vehicle body and which, though attached to the vehicle body or frame for convenient operation, does not interfere with the movement of the vehicle when the device is in its folded position.

Additional objects and advantages of the invention will become apparent from the following description and accompanying drawings, wherein:

FIG. 3 is an enlarged view similar to that shown in FIG. 2 illustrating the manner in which the device is used to stabilize the vehicle and the manner in which it is folded into the position assumed when the vehicle is being transported;

FIG. 4 is a fragmentary cross-sectional view of the device, the section being taken on line 4—4 of FIG. 3;

FIG. 5 is a top plan view of the device as viewed from the position indicated at line 5—5 of FIG. 3;

FIG. 6 is a fragmentary side elevational view of one of the operating mechanisms of the device;

FIG. 7 is a fragmentary cross-sectional view taken on line 7—7 of FIG. 6;

FIG. 8 is a side elevational view of the mechanism shown in FIG. 7; and

FIG. 9 is a cross-sectional view of the device taken on line 9—9 of FIG. 7.

Figure 1:
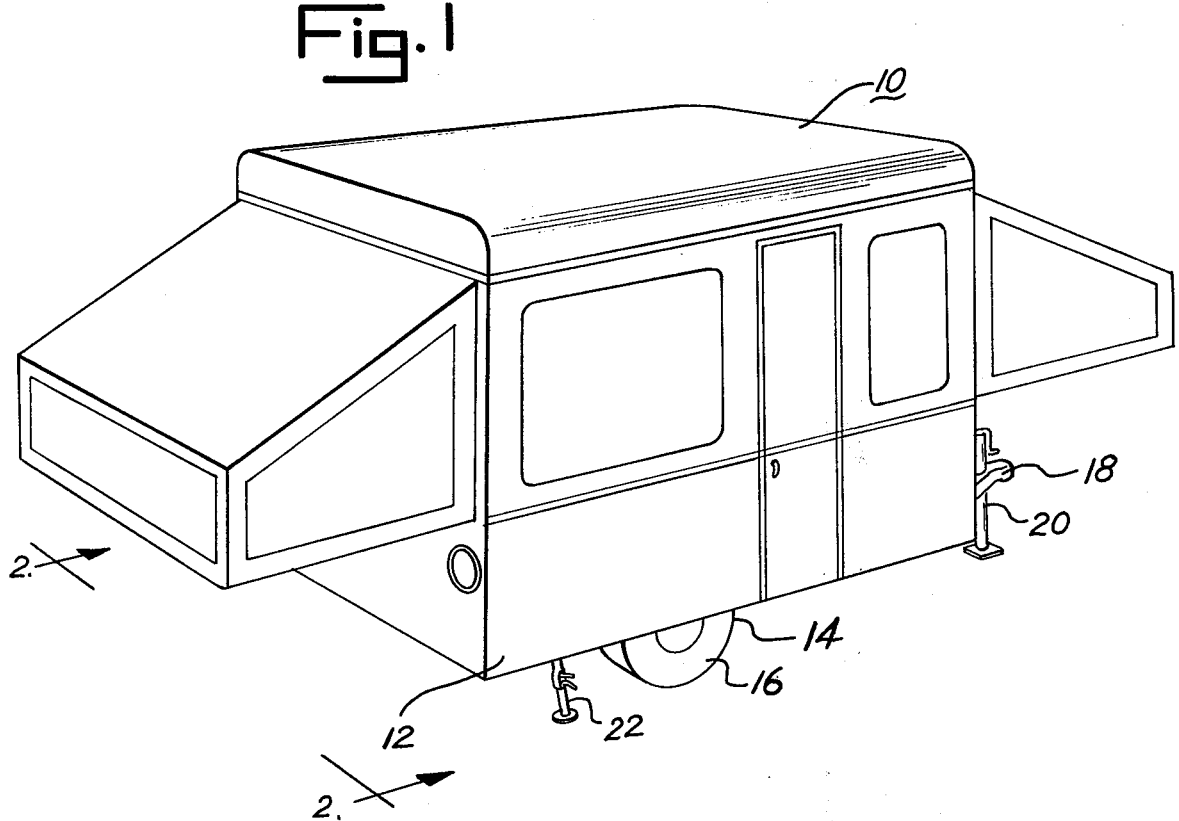
FIG. 1 is a perspective view of a camper illustrating one of the devices and showing the manner in which it is used to stabilize the vehicle.

Referring more specifically to the drawings and to FIG. 1 in particular, numeral 10 indicates generally a camper having a body 12, undercarriage 14 with wheels 16, tongue 18 and a tongue jack 20 attached to the tongue for supporting the forward end of the camper when it is disconnected from the tractive vehicle. Jack 20 is adjustable so that when the tongue is connected by a hitch to the tractive vehicle the jack can be retracted upwardly out of the way so that it does not interfere with the movement of the camper. The vehicle when parked is supported by the wheels on each side of the undercarriage and by jack 20. While this tripod arrangement will support the camper, the body is easily swayed or rocked by persons moving around in the camper and may be sufficiently overloaded at the rear to cause it to tip rearwardly when the camper is in its unfolded position shown in FIG. 1.

In the drawings, only two rear stabilizing devices 22 are shown, and in some installations the two, in combination with the tongue jack, will give adequate stability to the vehicle. However, for the larger vehicles it may be advisable to use a stabilizing jack at each of the front corners regardless of whether or not the tongue jack is used. The installation of the jack at either of the two rear corners or at all four corners is essentially the same, and hence only one stabilizing device installation will be described in detail.

Figure 2:
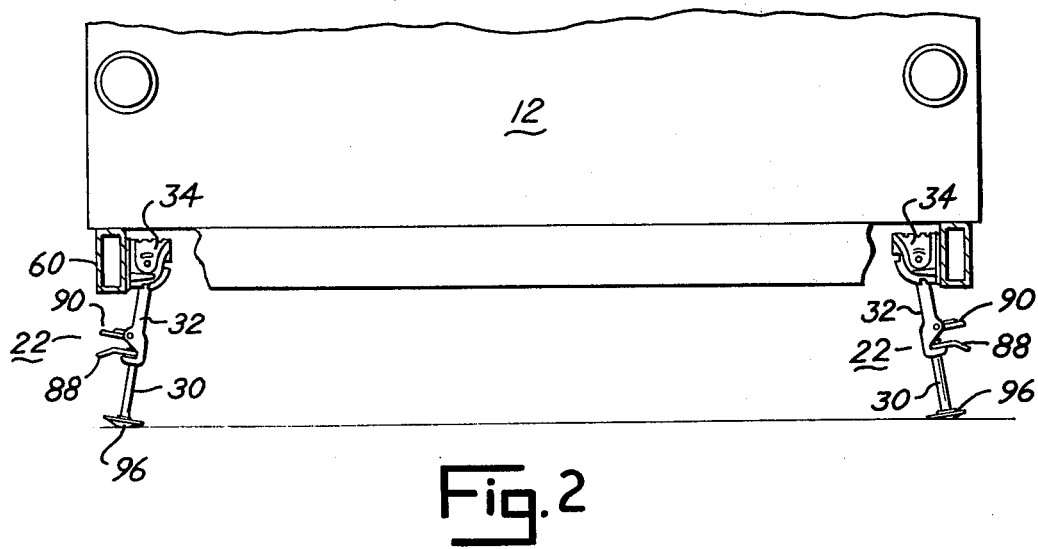
FIG. 2 is a fragmentary end elevational view of the camper shown in FIG. 1 with a portion thereof broken away to illustrate the operation of the present stabilizing device.

The device 22 includes a main shaft 30 of round cross-sectional configuration and an elongated member 32 of a square cross-sectional configuration. Member 32 is hollow and shafts 30 and 32 are telescopically arranged relative to one another so that shaft 30 will retract into and extend from member 32. The upper end of member 32 is pivotally connected to a fixture 34 by a rivet 36 extending through side walls 38 and 39 of fixture 34, permitting the assembly 40, consisting of shaft 30 and member 32, to swing from an essentially vertical position, shown in full lines in FIG. 3, to the horizontal position shown in broken lines, the former being the operating stabilizing position and the latter position being that assumed when the vehicle is being transported. The assembly is latched in place in the vertical and horizontal positions by a lug 42 in the side of member 32 seating in a slot 44 in the lower portion of side wall 39 for the vertical position and seating in slot 46 in the side wall for the horizontal position. The lug 42 is released from the slot by pulling the assembly radially outwardly from pin 36 which passes through the two side walls of fixture 34, and through elongated slots 48 and 50 in the side walls in the upper end of member 32. A spring 52 reacting between pin 36 and the upper closed end 54 of member 32 urges the assembly upwardly to seat lug 42 in either of the two slots 44 and 46. Fixture 34 is rigidly secured either to the frame member 60, such as shown in FIGS. 2 and 3, or it may be secured to the floor structure of the vehicle, preferably by bolts, screws or other suitable securing means.

The telescopic action between shaft 30 and member 32 is controlled by a mechanism 70 consisting of an upper lever 72 and a lower lever 74, the two levers being pivoted in openings 76 and 78, respectively, of housing 80 joined integrally to and forming a part of the lower end of member 32. The two levers contain holes for receiving shaft 30 to permit mechanism 70 and member 32 to move axially with respect to shaft 30. The portion of each lever defining the hole is offset angularly from the longitudinal plane of the respective lever. A spring 82 reacting between the lower side 84 of housing 80 and the under side of lever 74 releasably holds lever 74 in a latching position, and spring 86 reacting between the upper side of lever 74 and the under side of lever 72, yieldably retains lever 72 in a free position, permitting shaft 30 to slide therethrough. Lever 74 has a release pedal 88 which can easily be depressed by the operator to release the latching effect of the lever and thereby permit the rod to telescope inwardly into hollow member 32. Lever 72 is operated by a pedal 90 pivotally connected to housing 80 by stems 92 and 93, the pedal when depressed engaging the outwardly extending arm 94 of lever 72 and depressing the lever sufficiently to cause the inner edge (i.e., the edge opposite the pedal) of the hole in the lever to engage the external surface of shaft 30 and thereby form an abutment which causes member 32 to move upwardly when pedal 90 is depressed.

A shoe 96 is attached to the lower end of shaft 30 to permit the device to seat firmly on the ground or other suitable supporting surface. The under side of the shoe is preferably of a convex shape to permit the device to adapt more effectively to uneven ground. The shoe is preferably secured to the shaft by a screw; however, other suitable securing means may be used. Member 32, fixture 34, shoe 96 and the two levers are preferably stampings, although they may be fabricated by other methods if desired.

In the operation of the present vehicle stabilizing device, the device is secured to the under side of the vehicle either on the frame or to the under side of the floor structure. When the device is to support and stabilize a vehicle, such as a camper, the assembly is moved from the horizontal position adjacent the under side of the floor to the substantially vertical position illustrated in FIG. 3. Shaft 30 can then be moved axially downwardly until shoe 96 seats on the ground. After the stabilizing devices at the two rear corners have been extended in the foregoing manner, pedal 90 is then operated, preferably by the foot of the operator, causing a jacking action, i.e., causing member 32 to move upwardly and apply an upward pressure to the under side of the trailer. This operaton is performed at the two rear corners until the camper is level and firmly supported by the two stabilizing devices. With this device, the vehicle can be precisely leveled quickly and with very little difficulty. If stabilizing devices are used at the front corners, the same procedure is followed with respect to all four devices to level the trailer and provide firm support at all four corners. Normally only the rear stabilizing devices are used, and the tongue jack forms the front stabilizing unit, thus in effect providing a tripod arrangement for stabilizing the vehicle.

The hole in each of the levers 72 and 74 for shaft 30 is substantially the same diameter as the shaft and the lower and upper edges of the hole at the front and rear of the lever are offset axially from one another. When the levers are in clamping position, the top forward edge of the holes, i.e., on the side adjacent the pedals, and the bottom rearward edge of the holes contact the shaft causing the clamping action.

When the vehicle is to be moved, the stabilizing devices are retracted and folded from the position shown in full lines in FIG. 3 to the position shown in broken lines, by the operator depressing pedal 88, thus releasing the holding action of lever 74 and permitting the operator to telescope shaft 30 upwardly into member 32. The assembly can then easily be rotated from the vertical to the horizontal position by first releasing lug 42 from slot 44 by pulling downwardly on member 32 against the action of spring 52 to cause lug 42 to move free of slot 44. When the assembly is moved to the horizontal position, spring 52 seats lug 42 in slot 46, thus retaining the assembly 40 in its horizontal, folded position. The assembly is returned to its vertical position after the trailer is parked by a similar lug releasing operation, i.e., by pushing member 32 axially away from fixture 34 sufficiently to disengage lug 42 from slot 46 and thereafter swinging the assembly downwardly to the vertical position.

While only one embodiment of the present vehicle stabilizing device has been described in detail herein, various changes and modifications may be made without departing from the scope of the invention.

We claim:

1. A vehicle stabilizing device comprising upper and lower elongated members in telescopic relation to one another, a mechanism for extending said members in relation to one another to support a part of the vehicle, said mechanism including a body connected to one of said elongated members, a pair of levers pivoted to one end to said body and having a means defining a hole for receiving the other of said elongated members, the means defining said holes in said levers being offset angularly from the longitudinal plane of the respective lever, spring means for retaining one of said levers in releasable engagement with the other of said elongated members, a third lever for operating the other of said levers to extend said members axially relative to one another, a means for pivotally attaching an end of one of said elongated members to the vehicle near the lower part thereof for movement from a substantially vertical position to an angular position therefrom, and a means on said last mentioned means for retaining said members in said angular position.

2. A vehicle stabilizing device as defined in claim 1 in which said upper elongated member is hollow and said lower elongated member is a shaft and moves telescopically inside said upper elongated member.

3. A vehicle stabilizing device as defined in claim 2 in which said mechanism is attached to said upper elongated member.

4. A vehicle stabilizing device as defined in claim 1 in which said third lever has a pedal means on the free end thereof to permit the operator to move the lever with his foot to extend the two members relative to one another.

5. A vehicle stabilizing device as defined in claim 2 in which a shoe is provided on the lower end of the shaft for seating on the ground.

* * * * *